Figure 1:
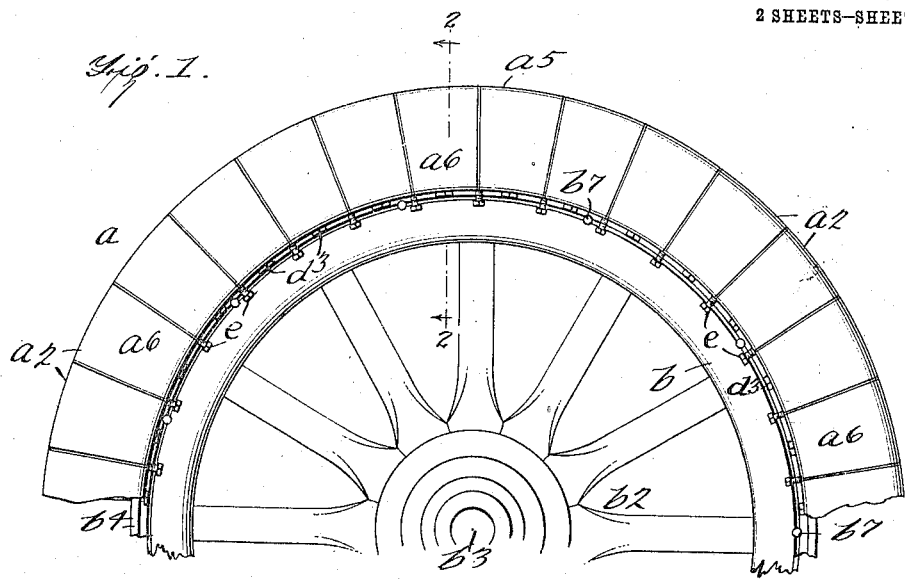

C. L. & F. K. NEELY.
TIRE.
APPLICATION FILED JUNE 4, 1914.

1,135,836.

Patented Apr. 13, 1915.

2 SHEETS—SHEET 1.

WITNESSES

INVENTORS
CLARENCE L. NEELY,
FLOYD K. NEELY,
BY Munn & Co
ATTORNEYS

C. L. & F. K. NEELY.
TIRE.
APPLICATION FILED JUNE 4, 1914.
1,135,836.
Patented Apr. 13, 1915.
2 SHEETS—SHEET 2.
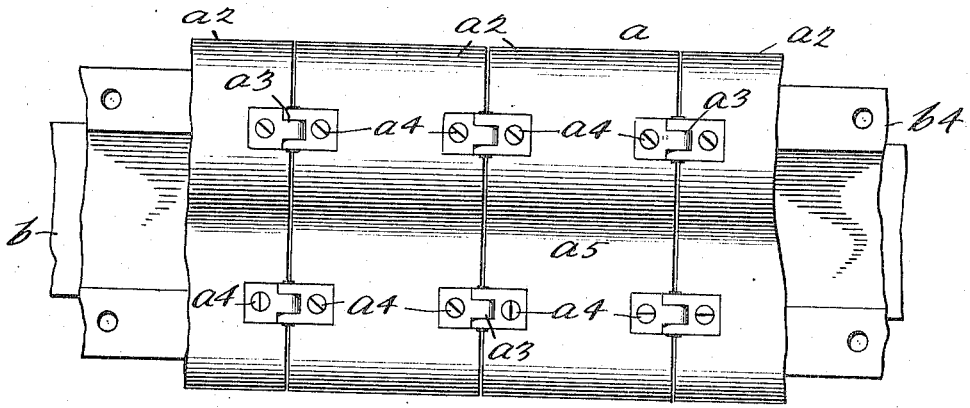
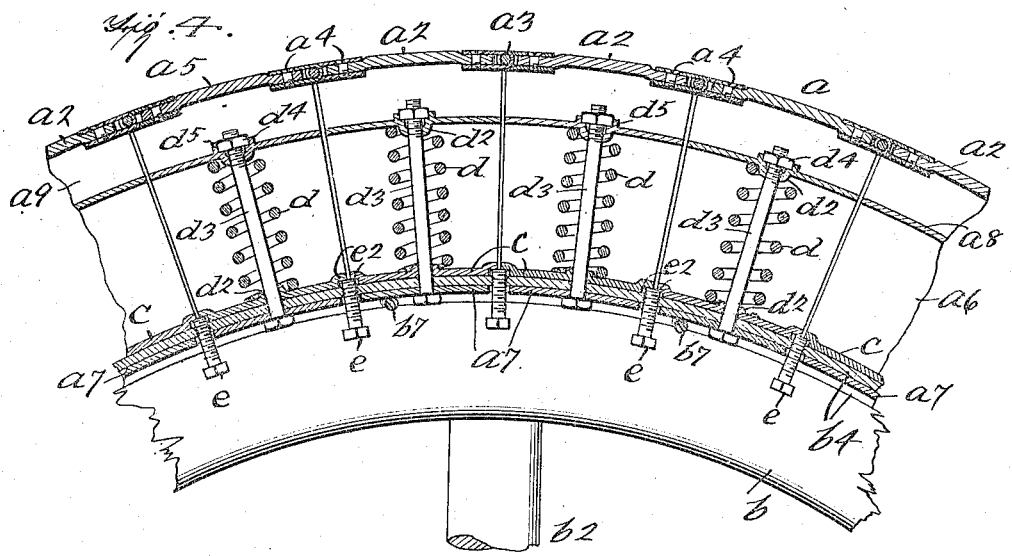
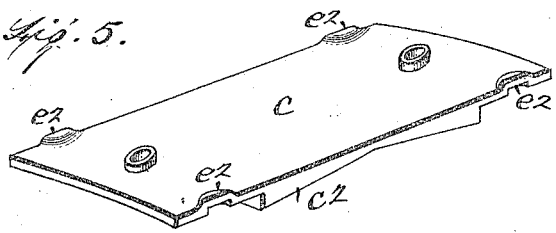
WITNESSES
INVENTORS
CLARENCE L. NEELY
FLOYD K. NEELY
BY
ATTORNEYS

UNITED STATES PATENT OFFICE.

CLARENCE LESLIE NEELY AND FLOYD KIRK NEELY, OF CORYDON, IOWA.

TIRE.

1,135,836.   Specification of Letters Patent.   Patented Apr. 13, 1915.

Application filed June 4, 1914. Serial No. 842,894.

*To all whom it may concern:*

Be it known that we, CLARENCE L. NEELY, and FLOYD K. NEELY, citizens of the United States, and residents of Corydon, in the county of Wayne and State of Iowa, have invented certain new and useful Improvements in Tires, of which the following is a specification.

Our invention relates to vehicle tires, and the main object thereof is to provide a substitute for the pneumatic tires now in use which will not require inflation by means of air, thereby avoiding all the tire troubles now experienced.

A further object is to so construct the tire that lateral resiliency of the same is possible as well as the vertical resiliency.

A further object is to provide means for increasing or decreasing the compression of the resilient devices at will, whereby the tires may be adjusted to a contemplated load.

A further object is to form the tread of the tire of a plurality of members hinged together, and of such exterior form as to prevent skidding.

A further object is to provide a rim for our tires which may be made in suitable sizes to fit different size wheels without any alteration in the tire itself.

A further object is to provide such a tire which may be used with or without a rubber or other tread; and further objects are to provide such tires which are simple in construction and installation, efficient in use, comparatively inexpensive, and any of the parts of which may be readily detached and replaced in the event of wear thereon or injury thereto.

Our invention is fully described in the following specification, of which the accompanying drawings form a part, in which the separate parts are designated by the same reference characters in each of the views, and in which:—

Figure 2:
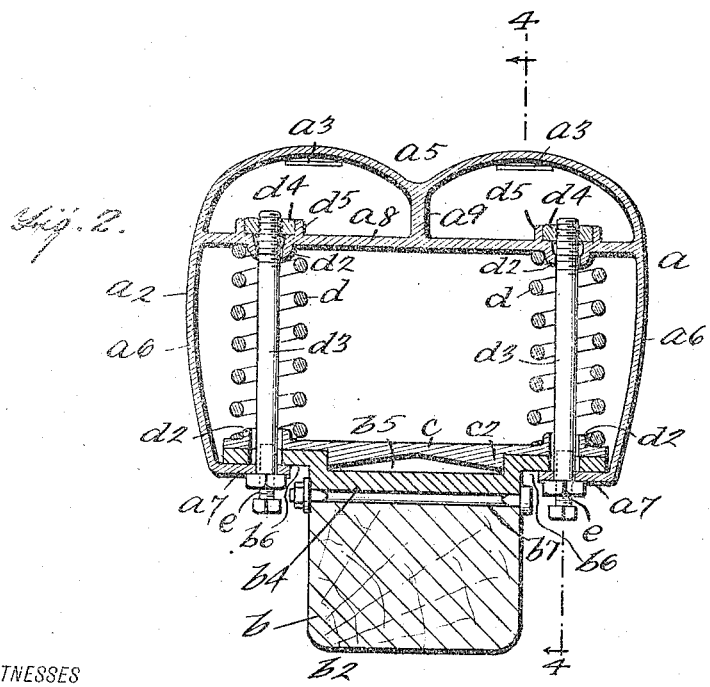

Figure 1 is a fragmentary, side, elevation of a wheel provided with a present preferred form of our invention; Fig. 2 is an enlarged section on the line 2—2 of Fig. 1; Fig. 3 is a fragmentary, plan, view of the tread; Fig. 4 is a section taken on the line 4—4 of Fig. 2; and Fig. 5 is a perspective view of a detail of the construction, removed from the tire.

In the drawings forming a part of this application we have shown a tire composed of an outer casing $a$ formed of a plurality of sections $a^2$ hinged together, as shown at $a^3$, the hinge elements being secured in position by means of screws $a^4$, or equivalent, said hinges being arranged in two parallel lines on the tread $a^5$ of the tire, said tread being preferably formed of two curved ridges divided by a peripheral groove, as clearly shown in Fig. 2, whereby two actual treads are produced.

The casing sections have, each, side portions $a^6$ and inwardly turned inner ends $a^7$, arranged outside of the felly $b$ of the wheel $b^2$, whereby said ends may move inwardly toward the wheel hub $b^3$, as later described, and said casing sections have, each, a transverse, substantially horizontal, partition $a^8$ and a longitudinal, vertical, partition $a^9$, the latter extending from the peripheral tread groove to the former partition and forming a strengthening web.

The felly $b$ carries a demountable rim $b^4$ which has a central, outer, groove $b^5$, and oppositely arranged, inner, side grooves $b^6$ within which the section ends $a^7$ normally rest, on corresponding sides of the felly $b$, said rim being continuous around the felly, and resting on the outer surface of said rim, within each tire section, is a plate $c$ having an inwardly directed member $c^2$ resting within the rim groove $b^5$, the shoulders formed by said member $c^2$ being adapted to impinge upon the corresponding sides of the said groove, to limit lateral movement of the plates $c$, and said rim is held on the felly by means of bolts $b^7$, or their equivalents.

On each side of the central plane of the wheel and tire is a coil spring $d$, in each tire section, the partition $a^8$ and plate $c$ serving as supports for said springs through the medium of bosses $d^2$ thereon, and the said partition and plate are perforated in the position of each boss, as are also the rim $b^4$ and section ends $a^7$, for radially arranged bolts $d^3$ having heads outside of said section ends and having nuts $d^4$ on their opposite ends, said nuts being prevented from revolving when the bolts are rotated by means of ridges $d^5$, or the like, on the partition $a^8$, as shown in Figs. 2 and 4, and the bolt holes in the rim $b^4$ are preferably transversely elongated to permit a degree of transverse bolt play, as are also the bolt holes in the plate $c$, the arrangement just described being the same in each of the tire sections $a^2$, and it will be understood that the bolts are freely movable radially of the wheel in the compression of the tire, and consequent movement of tire sections, against either or both of the coil springs $d$.

Arranged at the intersections of the tire sections, as clearly shown in Fig. 4, on each side of the felly, are screws $e$ which are freely movable in the section ends $a^7$ but threaded through the rim $b^4$, whereby they may be adjusted with reference thereto, radially of the wheel, and said screws impinge upon the inner faces of the plates $c$, suitable recesses $e^2$ being jointly formed by adjoining tire sections plates and in contiguous edges, and it will be seen that, when said screws are rotated to move the same outwardly of the rim, the ends of corresponding plates $c$ are likewise moved outwardly, toward the tire tread, against the action of the coil springs, thereby increasing the compression of the latter, and adapting the tire to heavier loads, and a reverse movement of the screws has the opposite effect as will be seen.

In the position of the parts as shown in Fig. 2, either or both of the tread ridges may be forced inwardly by road obstructions or inequalities, and the corresponding coil spring resists such movement independently of the other spring, thus duplicating the lateral "give" of a pneumatic tire, this independent spring actuation being made possible by the tread formation, and this formation also avoids skidding of the vehicle on which our tires are mounted, whereas the tire section edges assist in hill climbing and in maintaining a wheel grip on the road under all conditions.

While we have not illustrated the same, we may employ a rubber or other tread upon the periphery of our tire and, if so, we will so form the outer face thereof as to maintain the independent spring action hereinbefore explained, and it will be noted that the said bolts are carried inwardly in the compression of corresponding springs, and the tire section ends $a^7$ move inwardly over the sides of the felly, radially of the wheel, in such spring compression, on either side of said felly, and this constitutes one of the main features of our invention.

Because of the individual tire sections, compression of one from normal peripheral line, by a road obstacle, also draws the two adjacent sections inwardly, thus bringing the forward section into position to meet another obstacle, as in pneumatic tires, and it will also be seen that any of the parts may be easily removed, for substitution or repair, without materially affecting the tire as a whole.

While we have shown a present preferred form of construction, we do not limit ourselves thereto, but may make changes thereover, within the scope of the following claims, and, reserving the right to such changes,

What we claim as new and desire to secure by Letters Patent, is:—

1. The combination of a vehicle wheel, of a felly, a rim thereon projected on each side of said felly, a casing formed of a plurality of sections collectively forming a tread and in hinged connection, each of said sections having an inwardly directed flange, on each side of the wheel, bearing on the inner surface of said rim, a partition in each section, a bolt on each side of each section passed through said rim and section flange and partition, to guide said section, and a spring on each bolt maintaining said rim and partition apart.

2. The combination of a vehicle wheel, of a felly, a rim thereon projected on each side thereof, a casing formed of a plurality of hinged sections, each of which comprises two outwardly convex portions, a transverse partition, a central partition joining said transverse partition and the tread portion between said convex portions, and an inwardly directed flange being on the under side of said rim, on each side of said felly, a bolt connecting each section flange with said transverse partition and passed through said rim, and a spring on each bolt resisting compression of said tread portion of said casing.

3. The combination of a vehicle wheel, of a felly, a rim thereon projected from each side thereof, a casing formed of a plurality of hinged sections collectively forming a tread, each of said sections having an inwardly directed flange on each side of the wheel bearing on the inner surface of said rim, a movable plate in each section and seated in said rim, a partition in each section, a bolt connecting each section flange with said partition and passed through said rim and said plate, and a spring on each bolt resisting compression of said tread.

In testimony whereof we have signed our names to this specification in presence of the subscribing witnesses.

CLARENCE LESLIE NEELY.
FLOYD KIRK NEELY.

Witnesses:
F. B. FRY,
W. H. TEDROW.